United States Patent [19]

Arnold

[11] 4,430,605
[45] Feb. 7, 1984

[54] MOTOR CONTROL SYSTEM UTILIZING SWITCHED CONTROLLER

[75] Inventor: Bruce E. Arnold, Clinton, N.J.

[73] Assignee: The Singer Company, Stamford, Conn.

[21] Appl. No.: 276,435

[22] Filed: Jun. 22, 1981

[51] Int. Cl.³ ............................................. H02P 3/06
[52] U.S. Cl. .................................... 318/386; 318/305; 200/86.5
[58] Field of Search .................... 318/255, 258–260, 318/270, 305, 384, 385, 386; 200/18, 61.89, 86.5

[56] References Cited

U.S. PATENT DOCUMENTS

| 3,250,874 | 5/1966 | Ivins | 200/86.5 |
| 3,663,772 | 5/1972 | Grabel et al. | 200/86.5 |
| 3,962,615 | 6/1976 | Spangler | 318/305 |
| 3,963,890 | 6/1976 | Streihammer | 200/86.5 |
| 3,983,344 | 9/1976 | Straihammer | 200/86.5 |
| 4,049,999 | 9/1977 | Thibaudon | 318/305 |
| 4,163,181 | 7/1979 | Farber | 318/305 X |
| 4,185,575 | 1/1980 | Brown et al. | 112/277 |
| 4,341,985 | 7/1982 | Houskamp | 318/386 X |

FOREIGN PATENT DOCUMENTS 1396834  6/1975  United Kingdom ............... 318/270

Primary Examiner—G. Z. Rubinson
Assistant Examiner—W. E. Duncanson, Jr.
Attorney, Agent, or Firm—David L. Davis; Robert E. Smith; Edward L. Bell

[57] ABSTRACT

A motor control system utilizes a low cost switched controller for provding operator initiated control signals. The controller has therein a pair of switches which together define four possible modes of operation, depending upon operator manipulation of the controller. These four modes cause the system to either stop the motor, decrease the speed of the motor, maintain the speed of the motor constant, or increase the speed of the motor.

7 Claims, 4 Drawing Figures

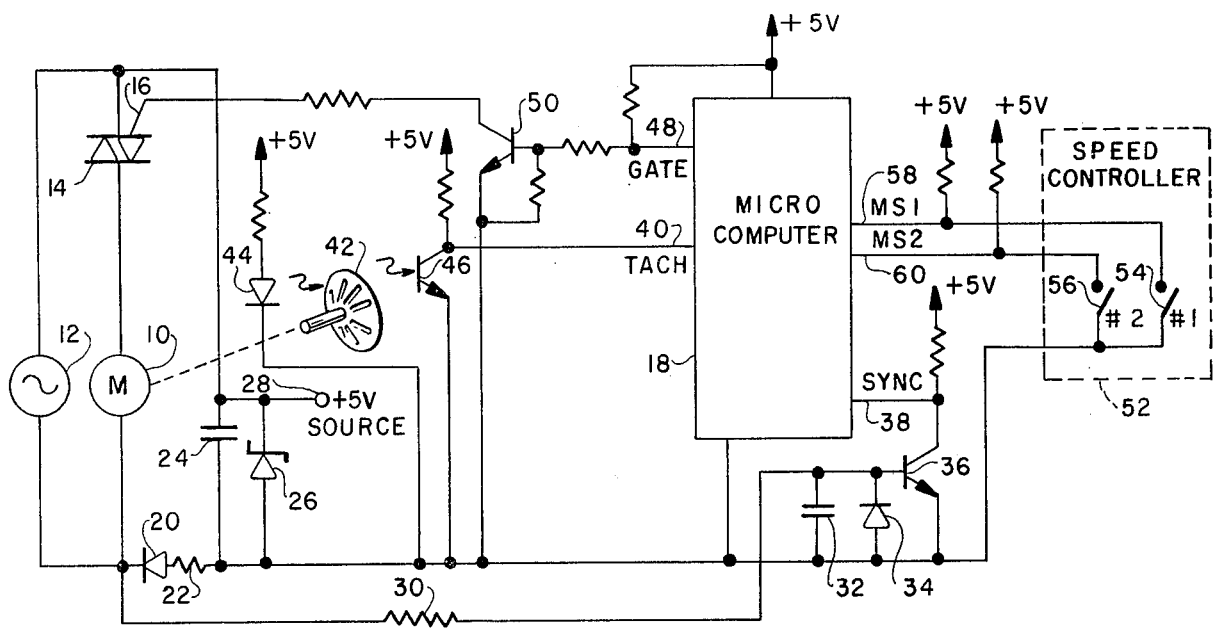
Fig. 1
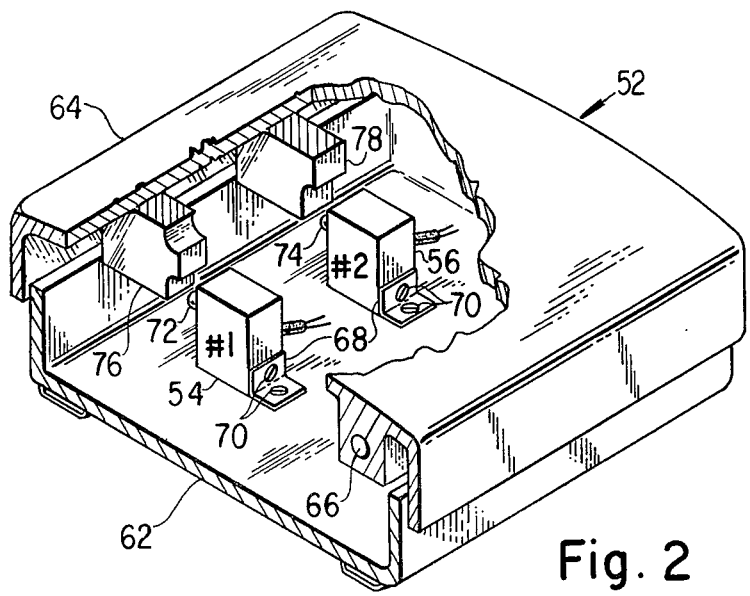
Fig. 2
| MODE | SWITCH 1(54) | SWITCH 2(56) | FUNCTION |
| --- | --- | --- | --- |
| 1 | OPEN | OPEN | STOP |
| 2 | CLOSED | OPEN | DECELERATE |
| 3 | CLOSED | CLOSED | MAINTAIN SPEED |
| 4 | OPEN | CLOSED | ACCELERATE |
Fig. 3

MOTOR CONTROL SYSTEM UTILIZING SWITCHED CONTROLLER

BACKGROUND OF THE INVENTION

This invention relates to motor control systems and, more particularly, to a motor control system utilizing a low cost switched controller for providing operator initiated control signals.

Conventional operator influenced motor control systems typically utilize an operator settable resistance for controlling motor speed. For example, the foot controller for a sewing machine motor speed control system typically utilizes either a carbon pile type resistor in order to control the current to the motor or a slide potentiometer to control the voltage speed reference in an SCR closed loop servo system. In either case, operator influence of the speed is effected by the operator varying the depression of the foot controller.

In recent years, motor driven appliances such as, for example, sewing machines, have become increasingly sophisticated, to the point where they may be controlled by microcomputers. With such a device, the full processing capability of the microcomputer is very rarely reached. Accordingly, it would be desirable to utilize the microcomputer for controlling additional functions of the appliance to thereby eliminate a certain amount of hardware and circuitry, resulting in lower costs. The motor speed control function of the appliance is one such candidate for incorporation by the microcomputer operation. It is therefore an object of the present invention to provide a motor control arrangement which is compatible with a microcomputer controlled appliance.

In order to provide the speed control function with a computer controlled system, the operator influenced controller information must be made compatible with the digital nature of the computer. This may be accomplished in a conventional manner by buffering the resistive signal from a conventional controller with a converter such as an analog-to-digital or an analog-to-frequency type. While this is effective, it also increases the cost of the system by adding the cost of the converter to the cost of the conventional controller. It is therefore another object of this invention to provide an improved controller which is directly compatible with computer operation.

In certain applications, such as for example in a sewing machine, the actual speed per se is not important, but rather the controlling element is how the operator perceives the speed. It is therefore a further object of this invention to provide an improved controller compatible with operator perception of speed.

SUMMARY OF THE INVENTION

The foregoing and additional objects are attained in accordance with the principles of this invention by providing a motor speed control system including a switched controller selectively settable to any of a discrete number of states. The system is responsive to the state of the controller for selectively controlling accelleration, decelleration, stopping and speed maintaining of the motor.

BRIEF DESCRIPTION OF THE DRAWINGS

The foregoing will be more readily apparent upon reading the following description in conjunction with the drawings in which like reference numerals in different figures thereof denote like elements and wherein:

FIG. 1 is a schematic circuit diagram of an illustrative embodiment of a motor control system constructed in accordance with the principles of this invention;

FIG. 2 shows an illustrative construction of a foot controller operating in accordance with the principles of this invention;

FIG. 3 is a table illustrating the different combinations of conditions of the switches in the foot controller of FIG. 2 in relation to the functions performed by the circuit of FIG. 1.

DETAILED DESCRIPTION

Figure 4:
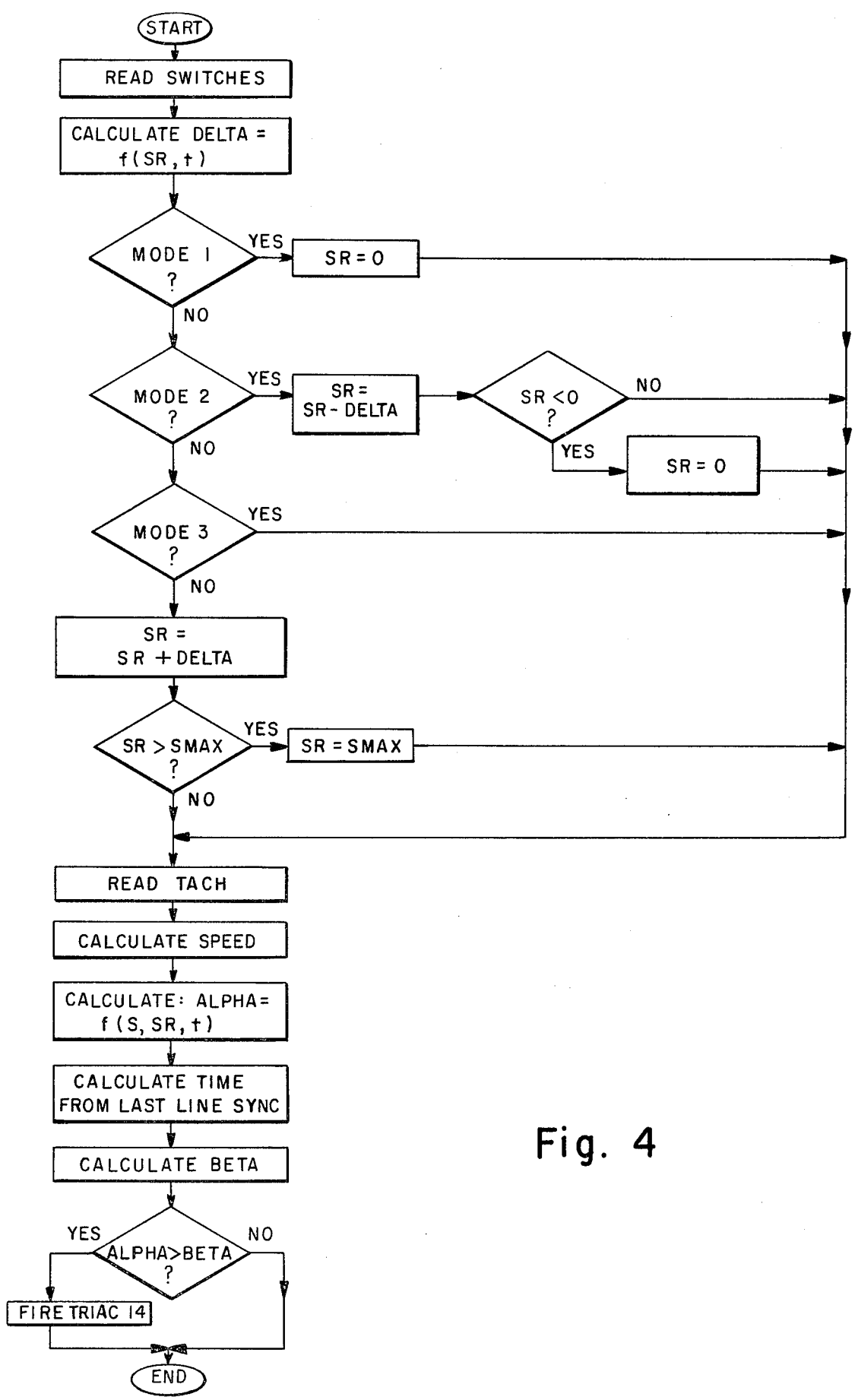
FIG. 4 is a flow chart illustrating the operation of the system of FIG. 1 in accordance with the principles of this invention.

Referring now to FIG. 1, shown therein is a schematic circuit diagram of an illustrative embodiment of a motor control system constructed in accordance with the principles of this invention for controlling the speed of a motor 10 connected to a cyclically varying power supply 12, which may be commercially available 115 volt 60 hertz power, through a triac 14. The speed of the motor 10 is controlled by controlling the phase angle at which the triac 14 is fired, as is well known in the art. This control is effected by controlling the time at which a pulse is applied to the gate 16 of the triac 14. As will be described in full detail hereinafter, the gating pulses are provided under the control of a microcomputer 18.

The serial connection of the diode 20 and the resistor 22 provides for isolation between the power supply 12 and the remainder of the logic circuitry. The capacitor 24 and the 5 volt Zener diode 26 provides a +5 volt source at the terminal 28 for the logic circuitry and the microcomputer 18.

The resistor 30, the capacitor 32, the diode 34 and the transistor 36 provide a +5 volt square wave synchronizing signal at the input 38 of the microcomputer 18. This square wave is in phase with the power supply 12 and has its leading and trailing edges corresponding to the zero crossings of the power supply 12.

To determine the speed of the motor 10, there is provided a tachometer input 40 to the microcomputer 18. Accordingly, there is illustratively coupled to the shaft of the motor 10 for rotation therewith an optical chopper disc 42 having a plurality of equally angularly spaced openings therein. A light emitting diode (LED) 44 is situated on one side of the disc 42 and a phototransistor 46 is situated on the other side of the disc 42 so that light from the LED 44 impinges on the base of the phototransistor 46 whenever one of the openings of the disc 42 is between the LED 44 and the phototransistor 46. Accordingly, there is provided at the input 40 of the microcomputer 18 a train of pulses at a rate corresponding to the speed of the motor 10.

To trigger the triac 14 into conduction at the appropriate time, the microcomputer 18 provides a pulse at a gate output 48 which turns on the transistor 50 to provide a trigger pulse to the gate 16 of the triac 14, rendering the triac 14 conductive for the remainder of the half cycle of the supply 12, as is well known in the art.

In accordance with the principles of this invention, speed control signals compatible with the operation of the microcomputer 18 are provided from a speed controller 52. The speed controller 52 includes a pair of switches 54 and 56, designated number 1 and number 2, respectively. These switches are connected to inputs 58 and 60 of the microcomputer 18, designated MS1, MS2, respectively. Each of the switches 54 and 56 may be either open or closed, to provide either a +5 volt or ground signal, respectively, to its corresponding input to the microcomputer 18. Depending upon the condition of the pair of switches 54, 56, the microcomputer 18 generates gating signals at its output 48 to control the speed of the motor 10. Illustratively, since there are two switches, each of which can assume two states, there are four possible combinations of input signals to the microcomputer 18 at inputs 58 and 60.

Referring now to FIG. 2, shown therein is an illustrative foot controller which may be utilized as the speed controller 52 (FIG. 1). This foot controller 52 is illustratively of the clam shell type and includes a base member 62 and a top member 64 connected to the base member 52 for pivoting movement about the pivot point 66 in known fashion. A spring member or the like (not shown) biases the top member 64 away from the base member 62 until foot pressure is applied to the top member 64. The switches 54 and 56 are mounted on the base member 62 in a conventional manner, as for example by angle brackets 68 and screws 70. The switches 54 and 56 are illustratively normally open switches having actuatable switching elements 72 and 74, respectively, normally biased to extend out from their respective switch housings. When the switching elements 72 and 74 are pushed inward of the housing of the switches 54 and 56, the respective switches 54 and 56 are closed. To control closure of the switches 54 and 56 when pressure is applied to the top member 64, there is provided a first cam element 76 and a second cam element 78, cooperating with the switching elements 72 and 74, respectively. The cam elements 76 and 78 are fixed to the top member 64 in a conventional manner, as by adhesive or the like. As is clear from FIG. 2, when no pressure is applied to the top member 64 of the foot controller 52, the switching elements 72 and 74 remain outward from the housings of their respective switches and the switches 54 and 56 remain open. As pressure is applied to the top member 64, the cam elements 76 and 78 are moved downward and the cam element 76 causes the switching element 72 to close the switch 54 while the switch 56 still remains open. As more pressure is applied to the top member 64, the cam element 78 causes the switching element 74 to close the switch 56, with the switch 54 remaining closed. As still more pressure is applied to the top member 64, the cam element 76 allows the switch 54 to open, while the cam element 78 keeps the switch 56 closed.

FIG. 3 shows in tabular form the aforedescribed operation. As shown in FIG. 3, the travel of the foot controller 52 is divided into four zones, or modes, each of which represents a different function to be performed by the motor control system of FIG. 1. Mode 1 corresponds to no pressure being applied to the foot controller 52 and represents the case where both switches are open. The control system interprets this condition as indicating operator desire to stop the motor. Mode 2 represents the case where a slight amount of pressure is applied to the controller 52 and wherein switch number 1 is closed and switch number 2 is open. The control system of FIG. 1 interprets this mode to deccelerate the motor. Mode 3 is where both switches are closed by a moderate amount of pressure being applied to the foot controller 52 and the system of FIG. 1 interprets this to maintain the speed of the motor at its present value. Mode 4 corresponds to full pressure being applied to the foot controller 52 wherein switch number 1 is open and switch number 2 is closed and the system of FIG. 1 recognizes this as operator desire to accellerate the motor.

FIG. 4 is a flow chart which may be utilized to program the microcomputer 18 (FIG. 1) to operate in accordance with the principles of this invention by receiving instructions from the speed controller 52 and controlling the firing of the triac 14. Within the microcomputer 18 there is a speed reference register SR wherein there is stored a numerical value corresponding to a desired speed for the motor 10. As shown in FIG. 4, initially the microcomputer 18 reads the switches 54 and 56 over the lines 58 and 60 to determine the mode of operation of the system, in accordance with the table of FIG. 3. Next, a quantity DELTA is calculated in accordance with an internal algorithm as a function of the value of the speed reference and, if the internal servo system is time based, also as a function of time. If it is determined that the system is to operate in Mode 1, SR is set to zero, indicating that the desired speed is zero, i.e., the motor is to be stopped. If the system is not to be in Mode 1, but rather is to be in Mode 2, SR is changed by subtracting DELTA therefrom. This corresponds to decreasing the desired speed. Next, a check is made to see whether the new value of SR has gone negative. If so, then SR is set to zero, its minimum allowable value. If the system is not to be operating in Mode 2, but instead is to be operated in Mode 3, SR remains the same, since Mode 3 corresponds to maintaining the speed of the motor 10 constant. If the system is not to be operated in Mode 3, this means that the system is to be operated in Mode 4, corresponding to accellerating the motor 10. In this case, SR is changed by adding the value of DELTA thereto. SR cannot be greater than some maximum value SMAX and if the addition of DELTA has caused SR to exceed SMAX, then SR is set to SMAX.

Now that a value of SR has been established, the system goes into a servo routine. First, the speed of the motor must be determined. This is accomplished by examining the input tachometer pulses over the lead 40 and calculating the speed S therefrom. This calculation may be done in any of several well known ways. For example, the number of tachometer input pulses in a given time may be counted to determine the speed or, alternatively, the time between successive tachometer input pulses may be utilized to determine speed. In any event, after the speed S is calculated, an angle ALPHA is calculated as a function of the speed S, the speed reference SR, and the time, if the servo is a time based servo. The angle ALPHA is the desired firing angle for the triac 14. Next, the time since the last leading edge of the synchronization pulse over the lead 38 is calculated. From that time, the actual phase angle BETA is calculated. If ALPHA is greater than BETA, the triac 14 is fired by applying a pulse to the gate output 48 of the microcomputer 18. If ALPHA is not greater than BETA, the routine is exited.

The routine shown in FIG. 4 is performed at regular intervals, as determined by the executive program of the microcomputer 18. In fact, this routine may be performed several times and the speed reference SR may be changed several times before the triac 14 is actually fired.

Although a microcomputer has been disclosed, it is apparent that hard wired circuitry may also be utilized to provide the desired operation. Further, although four modes of operation have been disclosed, it is apparent that by increasing the number of switches in the controller more modes are possible. Thus, for example, a system could operate with six modes, including both fast and slow acceleration and decelleration. Also, there could be acceleration, speed maintaining and decelleration for both forward and reverse operation of the motor. Additionally, with microcomputer control, the disclosed arrangement has application to automobile speed control, both with an electric motor and an internal combustion engine, in the latter case with the microcomputer controlling fuel flow. In fact, the disclosed speed control would be perceived by the operator to work somewhat like an automobile gas pedal, where the driver presses the pedal down until cruising speed is reached and then backs off in order to maintain speed. Thus, the position of the controller represents an operator desired rate of change of speed.

Accordingly, there has been disclosed a motor control system utilizing a low cost switched controller for providing operator initiated control signals. It is understood that the above-described embodiment is merely illustrative of the application of the principles of this invention. Numerous other embodiments may be devised by those skilled in the art without departing from the spirit and scope of this invention, as defined by the appended claims.

I claim:

1. A system for controlling the speed of a motor comprising:

switching apparatus selectively settable to any of four states;

operator actuable means for setting said switching apparatus to a desired one of said states, said operator actuable means being arranged to effect changes between states of said switching apparatus only in a defined order;

stopping means responsive to said switching apparatus being in a first of said states for stopping said motor;

decelleration means responsive to said switching apparatus being in a second of said states for decreasing the speed of said motor;

speed maintaining means responsive to said switching apparatus being in a third of said states for maintaining constant the speed of said motor; and accellerating means responsive to said switching apparatus being in a fourth of said states for increasing the speed of said motor.

2. A system for controlling the speed of a motor comprising:

switching apparatus selectively settable to any of four states;

operator actuable means for setting said switching apparatus to a desired one of said states, said operator actuable means being arranged to effect changes between states of said switching apparatus only in a defined order;

means for providing a speed reference signal;

means responsive to said switching apparatus being in a first of said states for setting said speed reference signal to a predetermined minimum valve;

means responsive to said switching apparatus being in a second of said states for decrementing the value of said speed reference signal by a predetermined amount;

means responsive to said switching apparatus being in a third of said states for maintaining said speed reference signal at its value;

means responsive to said switching apparatus being in a fourth of said states for incrementing said speed reference signal by said predetermined amount; and servo means for controlling the speed of said motor in accordance with the value of said speed reference signal.

3. The system according to claims 1 or 2 wherein said switching apparatus includes a pair of switching elements each of which is individually settable to either of two states.

4. The system according to claim 3 wherein each of said switching elements includes a movable actuator and said operator actuable means includes an element movable by an operator and means for effecting a predetermined sequence of operation of said switching element movable actuators in response to movement of said operator movable element.

5. A system for controlling the speed of a motor comprising:

switching apparatus selectively settable to any of a discrete number of states each of which represents a rate of change of speed of the motor;

operator actuable means for setting said switching apparatus to a desired one of said states, said operator actuable means being arranged to effect changes between states of said switching apparatus only in a defined order;

means for providing a speed reference signal;

means responsive to the state of said switching apparatus for selectively adjusting said speed reference signal as a function of the operator selected rate of change of speed; and servo means for controlling the speed of said motor in accordance with the value of said speed reference signal.

6. The system according to claim 5 wherein said switching apparatus includes a plurality of switching elements each of which is individually settable to either of two states.

7. The system according to claim 6 wherein each of said switching elements includes a movable actuator and said operator actuable means includes an element movable by an operator and means for effecting a predetermined sequence of operation of said switching element movable actuators in response to movement of said operator movable element.

* * * * *